United States Patent
Lee et al.

(10) Patent No.: US 10,951,319 B1
(45) Date of Patent: Mar. 16, 2021

(54) METHOD OF PERFORMING DYNAMIC POWER OPTIMIZATION IN FIBER-OPTIC COMMUNICATION SYSTEM AND RELATED FIBER-OPTIC COMMUNICATION SYSTEM

(71) Applicant: Moxa Inc., New Taipei (TW)

(72) Inventors: Yueh-Ju Lee, New Taipei (TW);
Shu-Hsien Liu, New Taipei (TW);
Ching-Ping Wu, New Taipei (TW);
Shao-Hua Li, New Taipei (TW)

(73) Assignee: Moxa Inc., New Taipei (TW)

(*) Notice: Subject to any disclaimer, the term of this patent is extended or adjusted under 35 U.S.C. 154(b) by 0 days.

(21) Appl. No.: 16/861,149

(22) Filed: Apr. 28, 2020

(30) Foreign Application Priority Data

Mar. 23, 2020 (TW) .................................. 10910961.7

(51) Int. Cl.
*H04B 10/00* (2013.01)
*H04B 10/40* (2013.01)
*H04B 10/67* (2013.01)
*H04B 10/564* (2013.01)

(52) U.S. Cl.
CPC ........... *H04B 10/40* (2013.01); *H04B 10/564* (2013.01); *H04B 10/672* (2013.01)

(58) Field of Classification Search
CPC .... H04B 10/40; H04B 10/564; H04B 10/672; H04B 10/07; H04B 10/0775; H04B 10/07955; H04B 10/0799; H04B 10/2589; H04J 14/0221

USPC ..................................... 398/135–139, 25, 38
See application file for complete search history.

(56) References Cited

U.S. PATENT DOCUMENTS

| | | |
|---|---|---|
| 2002/0027689 A1 | 3/2002 | Bartur |
| 2005/0083999 A1 | 4/2005 | Koo |
| 2005/0096080 A1* | 5/2005 | Choi ................... H04W 52/265 455/522 |
| 2005/0232635 A1 | 10/2005 | Aronson |
| 2006/0165417 A1 | 7/2006 | Hsieh |
| 2009/0214221 A1* | 8/2009 | Li .......................... H04B 10/40 398/136 |
| 2012/0263460 A1* | 10/2012 | Movassaghi ........... H04B 10/40 398/38 |
| 2018/0138970 A1* | 5/2018 | Schmidt .................. H04B 10/40 |
| 2018/0316420 A1* | 11/2018 | Gohel ................ H04B 10/2589 |

* cited by examiner

*Primary Examiner* — Hibret A Woldekidan
(74) *Attorney, Agent, or Firm* — Winston I Isu (57) ABSTRACT

A fiber-optic communication system includes a first optical transceiver and a second optical transceiver. First, the first optical transceiver is configured to transmit signals to the second optical transceiver using an optical transmission power having an initial value. When the optical receiving power inputted into the second optical transceiver is larger than the expected input power of the second optical transceiver, a power compensation value is acquired according to the optical receiving power and the expected input power. The first optical transceiver is configured adjust its optical transmission power according to the power compensation value and then transmit signals to the second optical transceiver using the adjusted optical transmission power.

10 Claims, 7 Drawing Sheets

METHOD OF PERFORMING DYNAMIC POWER OPTIMIZATION IN FIBER-OPTIC COMMUNICATION SYSTEM AND RELATED FIBER-OPTIC COMMUNICATION SYSTEM

CROSS REFERENCE TO RELATED APPLICATION

This application claims priority of Taiwan Application No. 109109617 filed on 2020 Mar. 23.

BACKGROUND OF THE INVENTION

1. Field of the Invention

The present invention is related to a method of performing dynamic power optimization in fiber-optic communication system and related fiber-optic communication system, and more particularly, to a method of performing dynamic power optimization in fiber-optic communication system according to the actual optical receiving power and the expected input power on the receiving end and related fiber-optic communication system.

2. Description of the Prior Art

Fiber-optic communication has revolutionized the telecommunications industry and the data networking community. Using optical fibers to transmit optical signals from one place to another, fiber-optic communications have enabled telecommunications links to be made over much greater distances, with much higher data rates and with higher security. As a result of these advantages, fiber-optic communication systems are widely employed for applications ranging from major telecommunications backbone infrastructure to Ethernet systems, broadband distributions, and general data networking.

Among various types of fiber-optic communication systems, there are typically three major components: optical fibers and optical cables made thereof, active optical devices, and passive optical devices. In the structure of a fiber-optic communication system, an optical transceiver is an active optical device configured to integrate the function of a transmitter and a receiver. An electrical-to-optical transceiver at the transmitting end is able to generate optical signals from electrical signals for subsequent data transmission. A corresponding optical-to-electrical transceiver at the receiving end is able to convert the optical signals received from the transceiver into the original electrical signals.

An optical transceiver normally adopts laser diodes (LDs) or light-emitting diodes (LEDs) as lighting devices for providing optical signals. The electrical-to-optical conversion efficiency of the optical transceiver is associated with the performance of its lighting device whose operational efficiency may be downgraded in a high-temperature industrial environment. In a prior art application, the optical transceiver is normally configured to transmit signals using a maximum optical transmitting power defined by its specification. If the optical transmitting power of the optical transceiver can be reduced while ensuring normal communication, the operational current can be greatly decreased for reducing the heat during the electrical-to-optical conversion, thereby slowing down the aging process of light devices and prolonging the lifespan.

SUMMARY OF THE INVENTION

The present invention provides a method of performing dynamic power optimization in a fiber-optic communication system. The method includes a first optical transceiver in the fiber-optic communication system transmitting a power correction request packet to a second optical transceiver in the fiber-optic communication system using an optical transmitting power having an initial value. acquiring a power compensation value according to an optical receiving power actually inputted into the second optical transceiver and an expected input power of the second optical transceiver when a value of the optical receiving power is larger than a value of the expected input power, adjusting the optical transmitting power according to the power compensation value, and the first optical transceiver transmitting signals to the second optical transceiver using the adjusted optical transmitting power.

The present invention also provides a fiber-optical communication system which includes a first optical transceiver, a first operation control unit, a second optical transceiver, and a second operation control unit. The first optical transceiver includes a first TOSA configured to transmit a signal using an optical transmitting power, a first ROSA, and a first power monitor circuit configured to monitor an operational status of the first optical transceiver. The first operation control unit is configured to adjust a value of the optical transmitting power. The second optical transceiver includes a second TOSA, a second ROSA configured to receive the signal transmitted by the first optical transceiver, and a second power monitor circuit configured to monitor an optical receiving power which is actually inputted into the second optical transceiver. The second operation control unit is configured to determine whether a value of the optical receiving power is larger than an expected input power of the second optical transceiver, and provide the optical receiving power and the expected input power for acquiring a power compensation value when determining that the value of the optical receiving power is larger than the value of the expected input power.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
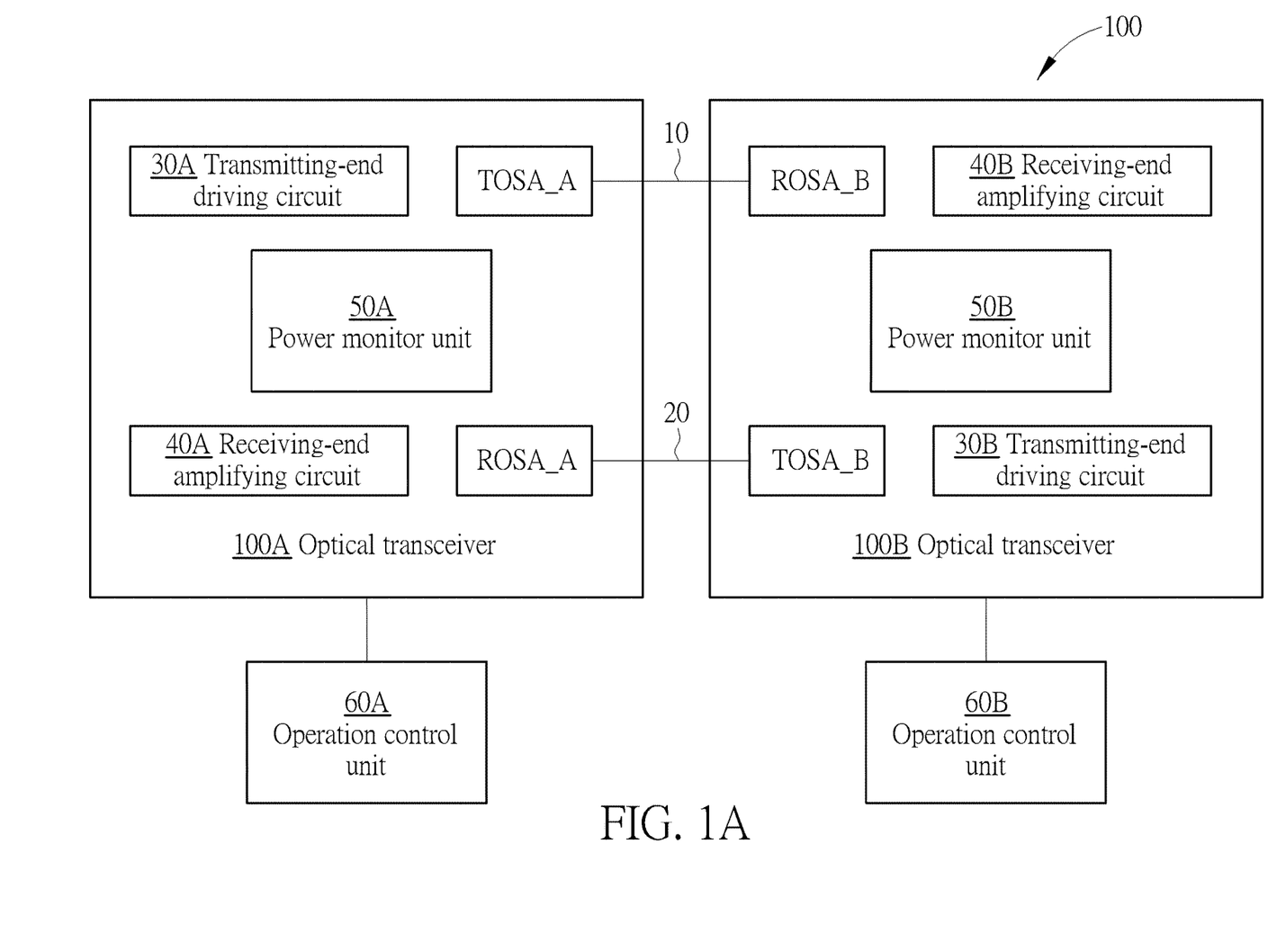
FIG. 1A is a functional diagram illustrating a fiber-optic communication system according to an embodiment of the present invention.
Figure 1B:
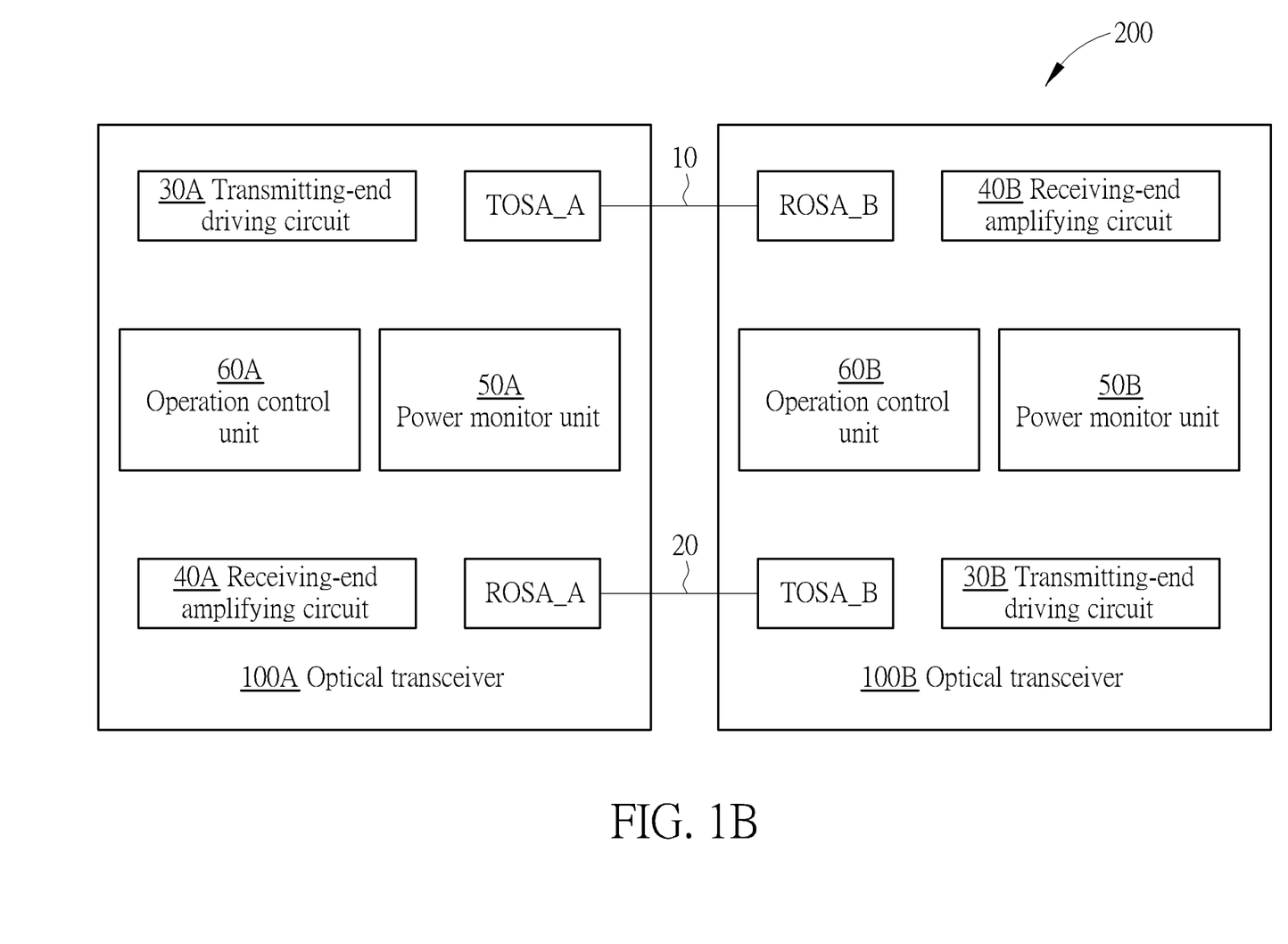
FIG. 1B is a functional diagram illustrating a fiber-optic communication system according to another embodiment of the present invention.

FIG. 1A is a functional diagram illustrating a fiber-optic communication system 100 according to an embodiment of the present invention. FIG. 1B is a functional diagram illustrating a fiber-optic communication system 200 according to another embodiment of the present invention. Each of the fiber-optic communication systems 100 and 200 includes a plurality of optical transceivers capable of transmitting optical signals using optical fibers. Each optical transceiver is configured to convert electrical signals into optical signals using electrical-to-optical conversion, and then transmit the optical signals to another optical transceiver using optical fibers. After receiving optical signals from another optical transceiver, each optical transceiver may convert the received optical signals into electrical signals using optical-to-electrical conversion, thereby supplying other electronic equipment. For illustrative purpose, FIGS. 1A and 1B depict the embodiment of two optical transceivers. However, the number of optical transceivers in the fiber-optic communication system 100 or 200 does not limit the scope of the present invention.

Each of the fiber-optic communication systems 100 and 200 includes an optical transceiver 100A, an optical transceiver 100B, an operation control unit 60A, an operation control unit 60B, and two optical fibers 10 and 20. The optical transceiver 100A includes a transmitter optical sub-assembly (TOSA) TOSA_A, a receiver optical sub-assembly (ROSA) ROSA_A, a transmitting-end driving circuit 30A, a receiving-end amplifying circuit 40A, and a power monitor unit 50A. The optical transceiver 100B includes a transmitter optical sub-assembly TOSA_B, a receiver optical sub-assembly ROSA_B, a transmitting-end driving circuit 30B, a receiving-end amplifying circuit 40B, and a power monitor unit 50B. The transmitter optical sub-assembly TOSA_A of the optical transceiver 100A may transmit optical signals to the receiver optical sub-assembly ROSA_B of the optical transceiver 200 using the optical fiber 10. The transmitter optical sub-assembly TOSA_B of the optical transceiver 100B may transmit optical signals to the receiver optical sub-assembly ROSA_A of the optical transceiver 100 using the optical fiber 20.

In the fiber-optic communication system 100A depicted in FIG. 1A, the operation control unit 60A and the optical transceiver 100A are two stand-alone devices, and the operation control unit 60B and the optical transceiver 100B are two stand-alone devices. In the fiber-optic communication system 100B depicted in FIG. 1B, the operation control unit 60A is integrated into the optical transceiver 100A, and the operation control unit 60B is integrated into the optical transceiver 100B. However, the implementations of the operation control units 60A and 60B do not limit the scope of the present invention.

Each of the transmitter optical sub-assemblies TOSA_A and TOSA_B includes lighting devices, photo detectors, optical mirrors and structural devices (not shown in FIGS. 1A and 1B) such as ferrules, sleeves, housings and transistor outline cans (TO-Cans). In the optical transceivers 100A and 100B, the lighting devices in the transmitter optical sub-assemblies TOSA_A and TOSA_B can convert electrical signals into optical signals, which are then directed into the corresponding optical fiber by a focusing device for data transmission. In the embodiments of the present invention, the lighting devices in the transmitter optical sub-assemblies TOSA_A and TOSA_B may be LDs or LEDs, such as using Fabry-Perot LDs, distributed feedback (DFB) LDs, vertical-cavity surface-emitting laser (VCSEL) diodes, fiber Bragg grating (FBG) LDs, GaAs LEDs or GaAsP LEDs for providing optical signals with various modulations, wavelengths, speeds and output power. However, the types of the lighting devices in the transmitter optical sub-assemblies TOSA_A and TOSA_B do not limit the scope of the present invention.

Each of the receiver optical sub-assemblies ROSA_A and ROSA_B includes light-detecting devices, transimpedance amplifier, optical mirrors and structural devices (not shown in FIGS. 1A and 1B) such as ferrules, sleeves, housings and TO-Cans. In the optical transceivers 100A and 100B, optical signals transmitted via the optical fibers may be directed into the light-detecting devices of the receiver optical sub-assemblies ROSA_A and ROSA_B and then converted into electrical signals. In the embodiments of the present invention, the light-detecting devices in the receiver optical sub-assemblies ROSA_A and ROSA_B may be PIN photodiodes, avalanche photodiodes (APD) or metal-semiconductor-metal (MSM) photodiodes. However, the types of the light-detecting devices in the receiver optical sub-assemblies ROSA_A and ROSA_B do not limit the scope of the present invention.

The transmitting-end driving circuits 30A and 30B are configured to provide driving signals for operating the lighting devices in the transmitter optical sub-assemblies TOSA_A and TOSA_B, respectively. The receiving-end amplifying circuits 40A and 40B are configured to amplify the signals outputted by the light-detecting devices in the receiver optical sub-assemblies ROSA_A and ROSA_B, respectively.

Figure 2:
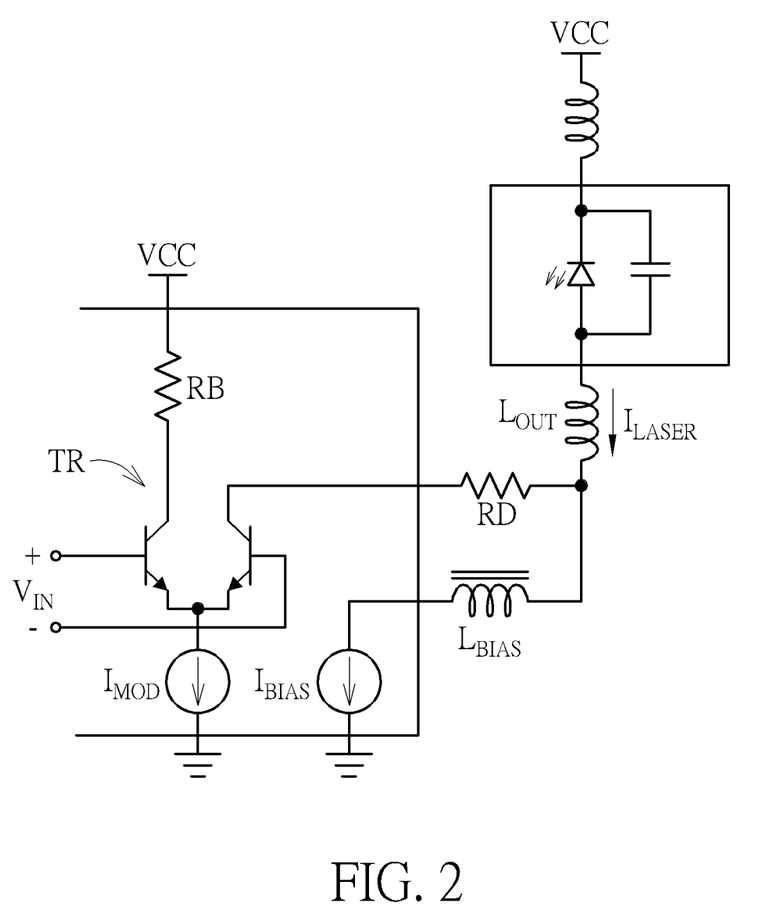
FIG. 2 is a diagram illustrating the implementation of the transmitting-end driving circuit in each optical transceiver of a fiber-optic communication system according to an embodiment of the present invention.

FIG. 2 is a diagram illustrating the implementation of the transmitting-end driving circuit in each optical transceiver of the fiber-optic communication system 100 or 200 according to an embodiment of the present invention. Each transmitting-end driving circuit includes a differential transistor pair TR, a balancing load RB, a modulated current source $I_{MOD}$, a bias current source $I_{BIAS}$ a damping resistor RD, an output inductor $L_{OUT}$, and a bias inductor $L_{BIAS}$. Each transmitting-end driving circuit is configured to provide driving current $I_{LASER}$ for operating the lighting device in the corresponding TOSA according to an input voltage $V_{IN}$, wherein $I_{LASER}=I_{BIAS}+I_{MOD}$. However, the implementation of the transmitting-end driving circuit in each optical transceiver does not limit the scope of the present invention.

Figure 3:
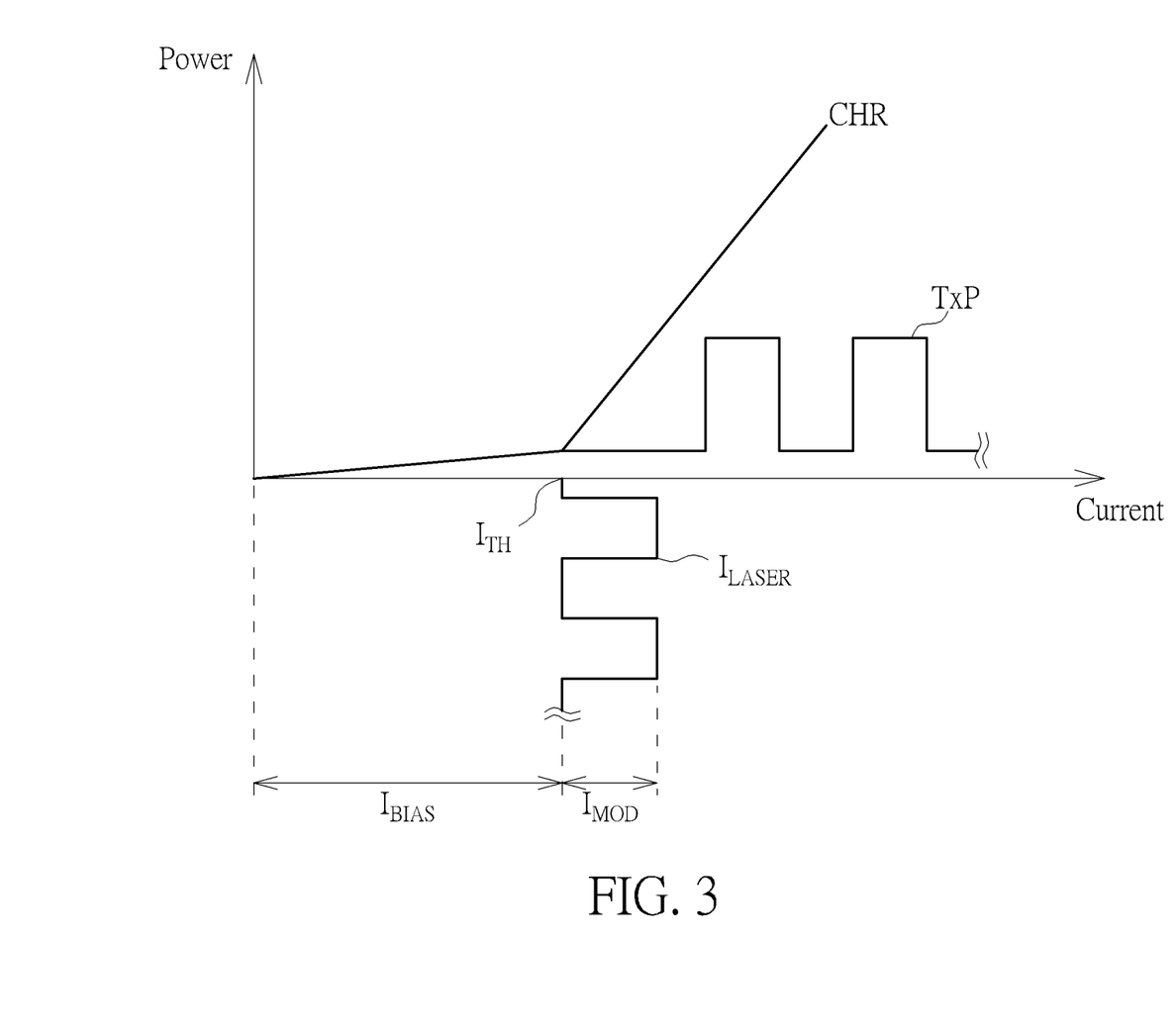
FIG. 3 is a diagram illustrating related waveforms during the operation of the transmitting-end driving circuit in each optical transceiver of a fiber-optic communication system according to an embodiment of the present invention.

FIG. 3 is a diagram illustrating related waveforms during the operation of the transmitting-end driving circuit in each optical transceiver of the fiber-optic communication system 100 or 200 according to an embodiment of the present invention. For illustrative purpose, it is assumed that each TOSA adopts a laser diode as its lighting device. The vertical axis represents TOSA output power, the horizontal axis represents current, CHR represents the characteristic curve of the laser diode, TxP represents the optical transmitting power of the TOSA, and $I_{LASER}$ represents the driving current provided by the transmitting-end driving circuit. When the driving current $I_{LASER}$ is not larger than a threshold current $I_{TH}$, the laser diode generates photons by spontaneous emission and thus has a small optical transmitting power TxP. When the driving current $I_{LASER}$ is larger than the threshold current $I_{TH}$, stimulated emission starts to dominate the coherent optical output of the laser diode, wherein the intensity of stimulation rapidly increases in response to an increase in the driving current $I_{LASER}$. In order to prevent the time delay between the logic 0 and logic 1 outputs of the laser due to intense stimulated emission, each transmitting-end driving circuit is configured to provide a constant bias current $I_{BIAS}$ for the logic 0 output, wherein the value of the bias current $I_{BIAS}$ is larger than the value of the threshold current $I_{TH}$, and $I_{LASER}=I_{BIAS}$. For the logic 1 output, each transmitting-end driving circuit is further configured to provide the modulated current $I_{MOD}$ which is switched on or off based on the input signal, wherein $I_{LASER}=I_{BIAS}+I_{MOD}$.

The power monitor unit 50A is configured to monitor the optical transmitting power TxP_A of the transmitter optical sub-assembly TOSA_A and the optical receiving power RxP_A of the receiver optical sub-assembly ROSA_A. The power monitor unit 50B is configured to monitor the optical transmitting power TxP_B of the transmitter optical sub-assembly TOSA_B and the optical receiving power RxP_B of the receiver optical sub-assembly ROSA_B.

Figure 4:
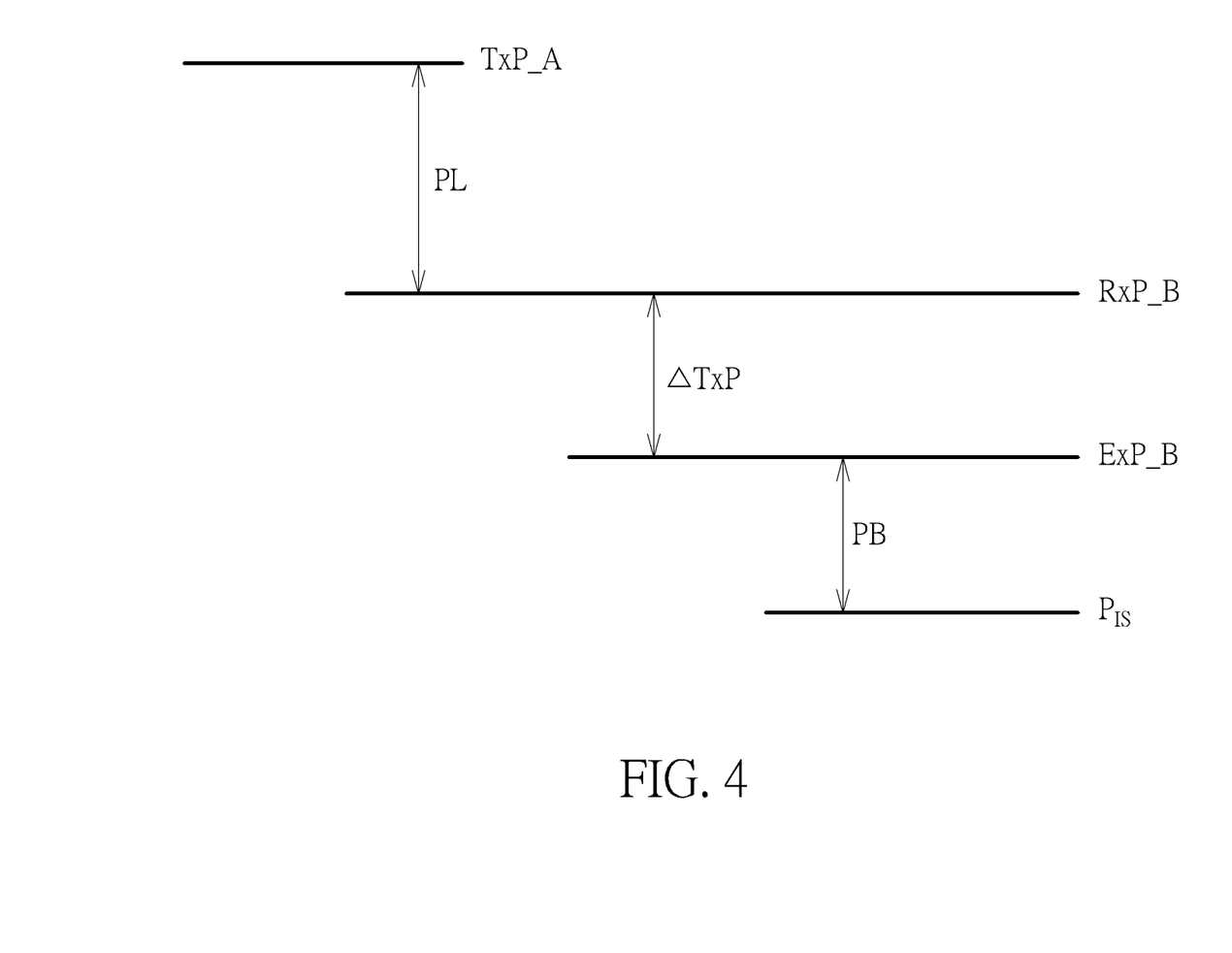
FIG. 4 is a diagram illustrating the relationship between the data monitored by each power monitor unit in a fiber-optic communication system according to an embodiment of the present invention.

FIG. 4 is a diagram illustrating the relationship between the data monitored by each power monitor unit in the fiber-optic communication system 100 or 200 according to an embodiment of the present invention. For illustrative purpose, it is assumed that the optical transceiver 100A is a transmitting-end device and the optical transceiver 100B is a receiving-end device. When the transmitter optical sub-assembly TOSA_A in the optical transceiver 100A transmits data using the optical transmitting power TxP_A, the optical receiving power RxP_B is the actual input power of the receiver optical sub-assembly ROSA_B in the optical transceiver 100B. There are two main loss mechanisms in an optical fiber: internal loss (material scattering loss, material absorption loss or waveguide scattering loss) and external loss (bending attenuation loss, micro bending attenuation loss, connection loss or manufacturing damage loss). As a result of a path loss PL due to the above-mentioned loss mechanisms, the received power of a receiving-end device is lower than the output power of a transmitting-end device, wherein PL=TxP_A−RxP_B Also, the optical transceiver 100B may have different settings of input sensitivity $P_{IS}$ for different brands of the receiver optical sub-assembly ROSA_B, while a power budge PB may reflect the degree of power attenuation due to the aging of internal devices of the optical transceiver 100B and the aging of optical fibers. The values of the input sensitivity $P_{IS}$ and the power budge PB may be set manually by the user or automatically by the system for different applications. The expected input power ExP_B of the optical transceiver 100B may be determined according to the input sensitivity $P_{IS}$ and the power budge PB, wherein ExP_B=$P_{IS}$+PB. As depicted in FIG. 4, when the optical receiving power RxP_B actually inputted into the optical transceiver 100B is larger than its expected input power ExP_B, an amount of power equal to a power compensation value ΔTxP is wasted, wherein Δ TxP=RxP_B−ExP_B.

In the present invention, the optical transceiver 100A may adjust the optical transmitting power TxP_A of its transmitter optical sub-assembly TOSA_A so as to make the power compensation value Δ TxP as small as possible while ensuring normal communication. Assuming that the initial value of the optical transmitting power TxP_A of the optical transceiver 100A is represented by TX0, the value of the optical transmitting power TxP_A after each adjustment may be represented by T1, wherein TX1=TX0−ΔTxP+n*ΔP, n is the number of fine-tune step, and ΔP represents the fine-tune amount of each fine-tune step.

Figure 5:
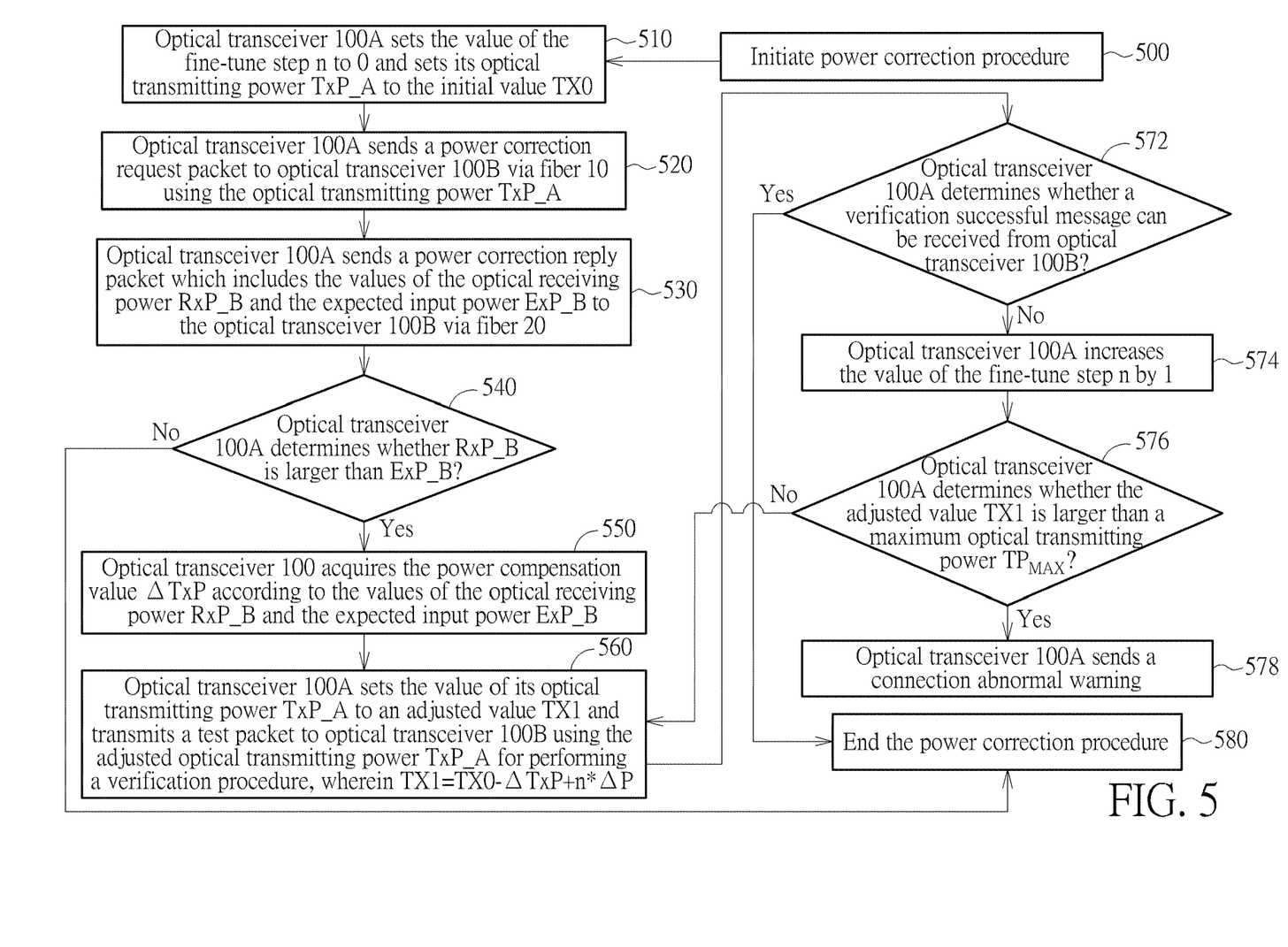
FIG. 5 is a flowchart illustrating the operation of a fiber-optic communication system according to an embodiment of the present invention.

FIG. 5 is a flowchart illustrating the operation of the fiber-optic communication system 100 or 200 according to an embodiment of the present invention. For illustrative purpose, it is again assumed that the optical transceiver 100A of the fiber-optic communication system 100 or 200 is a transmitting-end device capable of transmitting signals to the optical transceiver 100B on the receiving end using the fiber 10. The flowchart in FIG. 5 includes the following steps:

Step 500: initiate a power correction procedure; execute step 510.

Step 510: the optical transceiver 100A sets the value of the fine-tune step n to 0 and sets its optical transmitting power TxP_A to the initial value TX0; execute step 520.

Step 520: the optical transceiver 100A sends a power correction request packet to the optical transceiver 100B via the fiber 10 using the optical transmitting power TxP_A; execute step 530.

Step 530: the optical transceiver 100A sends a power correction reply packet which includes the values of the optical receiving power RxP_B and the expected input power ExP_B to the optical transceiver 100B via the fiber 20; execute step 540.

Step 540: the optical transceiver 100A determines whether the optical receiving power RxP_B is larger than the expected input power ExP_B; if yes, execute step 550; if no, execute 580.

Step 550: the optical transceiver 100 acquires the power compensation value ΔTxP according to the values of the optical receiving power RxP_B and the expected input power ExP_B; execute 560.

Step 560: the optical transceiver 100A sets the value of its optical transmitting power TxP_A to an adjusted value TX1 and transmits a test packet to the optical transceiver 100B using the adjusted optical transmitting power TxP_A for performing a verification procedure, wherein TX1=TX0−ΔTxP+n*ΔP; execute step 572.

Step 572: the optical transceiver 100A determines whether a verification successful message can be received from the optical transceiver 100B; if yes, execute step 580; if no, execute 574.

Step 574: the optical transceiver 100A increases the value of the fine-tune step n by 1; execute step 576.

Step 576: the optical transceiver 100A determines whether the adjusted value TX1 is larger than a maximum optical transmitting power $TP_{MAX}$; if yes, execute step 578; if no, execute 560.

Step 578: the optical transceiver 100A sends a connection abnormal warning.

Step 580: end the power correction procedure.

In response to poor connection or bad communication quality associated with an link-on event of the fiber-optic communication system 100 or 200 (such as when detecting an increase in CRC), the power correction procedure may be initiated in step 500 for acquiring an optimized power setting. For illustrative purpose, it is assumed that in the fiber-optic communication system 100 or 200, the optical transceiver 100A is a transmitting-end device and the optical transceiver 100B is a receiving-end device.

In step 510, the optical transceiver 100A is configured to set the value of the fine-tune step n to 0 and set the optical transmitting power TxP_A to the initial value TX0. In step 520, the optical transceiver 100A is configured to send the power correction request packet to the optical transceiver 100B via the fiber 10 using the optical transmitting power TxP_A having the initial value TX0. In an embodiment, the initial value TX0 is equal to a maximum optical transmitting power of the transmitter optical sub-assembly TOSA_A in the optical transceiver 100A defined by its specification. In another embodiment, the initial value TX0 may be equal to any value which is not larger than the maximum optical transmitting power of the transmitter optical sub-assembly TOSA_A in the optical transceiver 100A. However, the method of setting the initial value TX0 does not limit the scope of the present invention.

After receiving the power correction request packet from the optical transceiver 100A, the optical transceiver 100B is able to acquire the optical receiving power RxP_B actually inputted into the optical transceiver 100B. Then in step 530, the optical transceiver 100A is configured to send the power correction reply packet which includes the values of the optical receiving power RxP_B and the expected input power ExP_B to the optical transceiver 100A via the fiber 20.

In step 540, after receiving the power correction reply packet from the optical transceiver 100B, the optical transceiver 100A is configured to determine whether the optical receiving power RxP_B is larger than the expected input power ExP_B. When the optical receiving power RxP_B is larger than the expected input power ExP_B, the difference between the values of the optical receiving power RxP_B and the expected input power ExP_B results in a waste of power. Under such circumstance, the optical transceiver 100 is configured to acquire the power compensation value $\Delta TxP$ according to the values of the optical receiving power RxP_B and the expected input power ExP_B in step 550, wherein $\Delta TxP=RxP\_B-ExP\_B$. When determining that the optical receiving power RxP_B is not larger than the expected input power ExP_B, it indicates that the optical transceiver 100A may have an abnormal optical transmitting power TxP_A, or that a large path loss PL exists between the optical transceiver 100A and the optical transceiver 100B. Under such circumstance, step 580 is executed for ending the power correction procedure.

In step 560, the optical transceiver 100A is configured to set the value of its optical transmitting power TxP_A to the adjusted value TX1 and transmit the test packet to the optical transceiver 100B using the adjusted optical transmitting power TxP_A for performing the verification procedure, wherein $TX1=TX0-\Delta TxP+n*\Delta P$. After having executed step 560 for the first time, the value of the fine-tune step n is equal to 0 which was set in step 510. Under such circumstance, the value of the adjusted value TX1 is equal to the initial value TX0 subtracted by the power compensation value $\Delta TxP$.

As depicted in FIG. 4, the path loss PL existing between the optical transceiver 100A and the optical transceiver 100B may result in extra power consumption whose value may be influence by many factors. Therefore, the optical transceiver 100A is configured to perform the verification procedure in steps 572-578 to ensure that data can be successfully transmitted using the optical transmitting power TxP_A having the adjusted value TX1.

In step 560, the optical transceiver 100A is configured to transmit the test packet to the optical transceiver 100B using the optical transmitting power TxP_A having the adjusted value TX1. After receiving the test packet, the optical transceiver 100B is configured to perform the verification procedure and notify the optical transceiver 100A if the verification procedure is successful. If the optical transceiver 100A receives the verification successful message from the optical transceiver 100B, step 580 may then be executed for ending the power correction procedure. Under such circumstance, the optical transceiver 100A is configured to send signals to the optical transceiver 100B using the optical transmitting power TxP_A having the adjusted value TX1, thereby lowering power consumption while ensuring normal data transmission.

If unable to receive any verification successful message from the optical transceiver 100B, the optical transceiver 100A is configured to increase the value of the fine-tune step n by 1 and then determine whether the adjusted value TX1 is larger than the maximum optical transmitting power $TP_{MAX}$. If the adjusted value TX1 is not larger than the maximum optical transmitting power $TP_{MAX}$, the present method loops back to step 560.

When executing step 560 for the second time, the value of the fine-tune step n is equal to 1, and the value of the adjusted value TX1 is equal to the initial value TX0 subtracted by the power compensation value $\Delta TxP$ and plus a fine-tune value $\Delta P$. The optical transceiver 100A may then perform the verification procedure by transmitting the test packet to the optical transceiver 100B using the newly adjusted optical transmitting power TxP_A. When it is determined in step 572 that the verification procedure is successful, the optical transceiver 100A is configured to transmit data using the optical transmitting power TxP_A having the adjusted value TX1 equal to $TX0-\Delta TxP+\Delta P$.

If the verification procedure is still unsuccessful after executing step 560 for the second time, the optical transceiver 100A is configured to re-execute steps 572, 574 and 576 sequentially. When the fine-tune step n is increased to a value which allows the adjusted value TX1 ($TX0-\Delta TxP+n*LS$, P) to pass the verification procedure in step 560, step 580 is then executed for ending the power correction procedure. Under such circumstance, the optical transceiver 100A is configured to transmit data using the optical transmitting power TxP_A having the adjusted value TX1 equal to $(TX0-\Delta TxP+n*\Delta P)$. If it is determined in the fine-tuning process that the adjusted value TX1 equal to $(TX0-\Delta TxP+n*\Delta P)$ is larger than the maximum optical transmitting power $TP_{MAX}$, the optical transceiver 100A is configured to send the connection abnormal warning in step 578.

Figure 6:
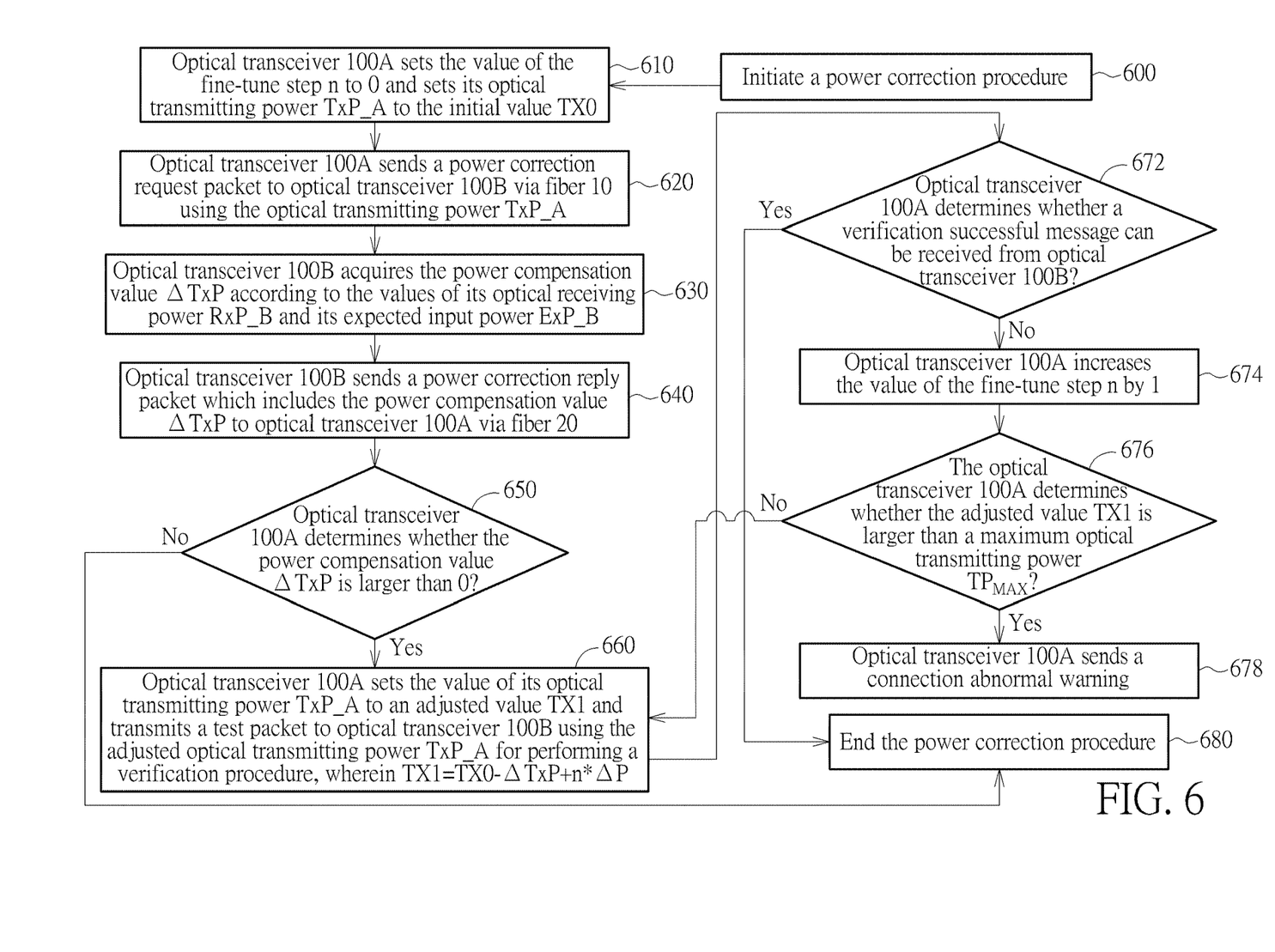
FIG. 6 is a flowchart illustrating the operation of a fiber-optic communication system according to another embodiment of the present invention.

FIG. 6 is a flowchart illustrating the operation of the fiber-optic communication system 100 or 200 according to another embodiment of the present invention. For illustrative purpose, it is again assumed that the optical transceiver 100A of the fiber-optic communication system 100 or 200 is a transmitting-end device capable of transmitting signals to the optical transceiver 100B on the receiving end using the fiber 10. The flowchart in FIG. 6 includes the following steps:

Step 600: initiate a power correction procedure; execute step 610.

Step 610: the optical transceiver 100A sets the value of the fine-tune step n to 0 and sets its optical transmitting power TxP_A to the initial value TX0; execute step 620.

Step 620: the optical transceiver 100A sends a power correction request packet to the optical transceiver 100B via the fiber 10 using the optical transmitting power TxP_A; execute step 630.

Step 630: the optical transceiver 100B acquires the power compensation value $\Delta TxP$ according to the values of its optical receiving power RxP_B and its expected input power ExP_B; execute 640.

Step 640: the optical transceiver 100B sends a power correction reply packet which includes the power compensation value $\Delta TxP$ to the optical transceiver 100A via the fiber 20; execute step 650.

Step 650: the optical transceiver 100A determines whether the power compensation value $\Delta TxP$ is larger than 0; if yes, execute step 660; if no, execute 680.

Step 660: the optical transceiver 100A sets the value of its optical transmitting power TxP_A to an adjusted value TX1 and transmits a test packet to the optical transceiver 100B using the adjusted optical transmitting power TxP_A for performing a verification procedure, wherein TX1=TX0−ΔTxP+n*ΔP; execute step 672.

Step 672: the optical transceiver 100A determines whether a verification successful message can be received from the optical transceiver 100B; if yes, execute step 680; if no, execute 674.

Step 674: the optical transceiver 100A increases the value of the fine-tune step n by 1; execute step 676.

Step 676: the optical transceiver 100A determines whether the adjusted value TX1 is larger than a maximum optical transmitting power $TP_{MAX}$; if yes, execute step 678; if no, execute 660.

Step 678: the optical transceiver 100A sends a connection abnormal warning.

Step 680: end the power correction procedure.

Steps 600-620 and 660-680 depicted in FIG. 6 are executed in the same manner as steps 500-520 and 560-580 depicted in FIG. 5, respectively. The method depicted in FIG. 6 differs from the method depicted in FIG. 5 in the execution of steps 530-550 and 630-650. In the embodiment illustrated in FIG. 5, the receiving-end optical transceiver 100B sends the values of its optical receiving power RxP_B and its expected input power ExP_B to the transmitting-end optical transceiver 100A, which then acquires the power compensation value ΔTxP accordingly and determines the value of the power compensation value ΔTxP. In the embodiment illustrated in FIG. 6, the receiving-end optical transceiver 100B acquires the power compensation value ΔTxP according to the values of its optical receiving power RxP_B and its expected input power ExP_B, and then sends the power compensation value ΔTxP to the transmitting-end optical transceiver 100A, which then determines the value of the power compensation value ΔTxP.

In the embodiment illustrated in FIG. 6, after acquiring the power compensation value ΔTxP according to the values of its optical receiving power RxP_B and its expected input power ExP_B in step 630, the optical transceiver 100B is configured to send the power correction reply packet which includes the power compensation value ΔTxP to the optical transceiver 100A via the fiber 20 in step 640. Next, the optical transceiver 100A is configured to determine whether the power compensation value ΔTxP is larger than 0 in step 650.

In conclusion, in the optical-fiber communication system of the present invention, each receiving-end optical transceiver is configured to periodically determine whether its optical receiving power is larger than its expected input power. A corresponding transmitting-end optical transceiver is configured to lower its optical transmitting power according to the difference between the values of the above-mentioned optical receiving power and the expected input power. A verification procedure can be performed for ensuring normal communication using the adjusted optical transmitting power. Therefore, the present can perform dynamic power optimization on a receiving-end optical transceiver in a fiber-optic communication system, thereby reducing power consumption while ensuring normal communication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing dynamic power optimization in a fiber-optic communication system, comprising:
a first optical transceiver in the fiber-optic communication system transmitting a power correction request packet to a second optical transceiver in the fiber-optic communication system using an optical transmitting power having an initial value;
acquiring a power compensation value according to an optical receiving power actually inputted into the second optical transceiver and an expected input power of the second optical transceiver when a value of the optical receiving power is larger than a value of the expected input power;
adjusting the optical transmitting power from the initial value to a first adjusted value which is acquired by subtracting the power compensation value from the initial value;
the first optical transceiver determining whether the optical transmitting power having the first adjusted value is able to pass a verification procedure after adjusting the optical transmitting power from the initial value to the first adjusted value; and
the first optical transceiver transmitting signals to the second optical transceiver using the optical transmitting power having the first adjusting value.

2. The method of claim 1, further comprising:
the second optical transceiver transmitting a power correction reply packet which includes the value of the optical receiving power and the value of the expected input power to the first optical transceiver after receiving the power correction request packet; and
the first optical transceiver acquiring the power compensation value according to the value of the optical receiving power and the value of the expected input power when determining that the value of the optical receiving power is larger than the value the expected input power.

3. The method of claim 1, further comprising:
the second optical transceiver acquiring the power compensation value according to the value of the optical receiving power and the value of the expected input power after receiving the power correction request packet;
the second optical transceiver transmitting a power correction reply packet which includes the power compensation value to the first optical transceiver; and
the first optical transceiver determining whether the value of the optical receiving power is larger than the value of the expected input power based on the power compensation value.

4. The method of claim 1, further comprising:
adjusting the optical transmitting power from the first adjusted value to a second adjusted value larger than the first adjusted value when determining that the optical transmitting power having the first adjusted value is unable to pass the verification procedure; and
the first optical transceiver transmitting signals to the second optical transceiver using the optical transmitting power having the second adjusting value when determining that the optical transmitting power having the second adjusted value is able to pass the verification procedure.

5. The method of claim 4, further comprising:
the first optical transceiver transmitting signals to the second optical transceiver using the optical transmitting power having the second adjusting value when determining that the second adjusted value is not larger than a maximum optical transmitting power; and the first optical transceiver sending an abnormal connection warning when determining that the second adjusted value is larger than the maximum optical transmitting power.

6. A fiber-optical communication system, comprising:
a first optical transceiver, comprising:
- a first transmitter optical sub-assembly (TOSA) configured to transmit a signal using an optical transmitting power;
- a first receiver optical sub-assembly (ROSA); and
- a first power monitor circuit configured to monitor an operational status of the first optical transceiver;
- a first operation control unit configured to adjust a value of the optical transmitting power according to a power compensation value;

a second optical transceiver, comprising:
- a second TOSA;
- a second ROSA configured to receive the signal transmitted by the first optical transceiver; and
- a second power monitor circuit configured to monitor an optical receiving power which is actually inputted into the second optical transceiver; and
- a second operation control unit configured to:
  - determine whether a value of the optical receiving power is larger than an expected input power of the second optical transceiver; and
  - provide the optical receiving power and the expected input power for acquiring the power compensation value when determining that the value of the optical receiving power is larger than the value of the expected input power.

7. The fiber-optical communication system of claim 6, wherein:
the second optical transceiver is further configured to transmit the value of the optical receiving power and the value of the expected input power to the first optical transceiver when determining that the value of the optical receiving power is larger than the value of the expected input power; and the first optical transceiver is further configured to acquire the power compensation value according to the value of the optical receiving power and the value of the expected input power.

8. The fiber-optical communication system of claim 6, wherein the second operation control unit is further configured to:
acquire the power compensation value according to the value of the optical receiving power and the value of the expected input power when determining that the value of the optical receiving power is larger than the value of the expected input power; and transmit the power compensation value to the first optical transceiver.

9. The fiber-optical communication system of claim 6, wherein the first operation control unit is further configured to:
adjust the optical transmitting power from an initial value to a first adjusted value which is acquired by subtracting the power compensation value from the initial value;

instruct the first optical transceiver to transmit the signal to the second optical transceiver using the optical transmitting power having the first adjusting value when determining that the optical transmitting power having the first adjusted value is able to pass a verification procedure and that the optical transmitting power having the first adjusted value is not larger than a maximum optical transmitting power of the first optical transceiver.

10. The fiber-optical communication system of claim 9, wherein the first operation control unit is further configured to:
adjust the optical transmitting power from the first adjusted value to a second adjusted value larger than the first adjusted value when determining that the optical transmitting power having the first adjusted value is unable to pass the verification procedure; and instruct the first optical transceiver to transmit the signal to the second optical transceiver using the optical transmitting power having the second adjusting value when determining that the optical transmitting power having the second adjusted value is able to pass the verification procedure and that the optical transmitting power having the second adjusted value is not larger than the maximum optical transmitting power.

* * * * *